US008093836B2

(12) United States Patent
Busse et al.

(10) Patent No.: US 8,093,836 B2
(45) Date of Patent: Jan. 10, 2012

(54) CIRCUIT ARRANGEMENT AND METHOD FOR STRIKING A DISCHARGE LAMP

(75) Inventors: Olaf Busse, München (DE); Siegfried Mayer, Moosinning (DE); Arwed Storm, Dachau (DE)

(73) Assignee: Osram AG, München (DE)

( * ) Notice: Subject to any disclaimer, the term of this patent is extended or adjusted under 35 U.S.C. 154(b) by 481 days.

(21) Appl. No.: 12/442,407

(22) PCT Filed: Sep. 25, 2006

(86) PCT No.: PCT/EP2006/066691
§ 371 (c)(1),
(2), (4) Date: Mar. 23, 2009

(87) PCT Pub. No.: WO2008/037290
PCT Pub. Date: Apr. 3, 2008

(65) Prior Publication Data
US 2010/0045201 A1 Feb. 25, 2010

(51) Int. Cl.
*H05B 37/02* (2006.01)
(52) U.S. Cl. ......... 315/307; 315/242; 315/243; 315/308
(58) Field of Classification Search .................. 315/291, 315/307, 308, 240, 241 R, 242, 243, 227 R
See application file for complete search history.

(56) References Cited

U.S. PATENT DOCUMENTS
5,416,387 A 5/1995 Cuk et al.
(Continued)

FOREIGN PATENT DOCUMENTS
WO WO 00/38483 A 6/2000

OTHER PUBLICATIONS

Bor-Ren Lin et al., "Dimming control of metal halide lamp with high power factor", Industrial Electronics, 1999, ISIE '99. Proceedings of the IEEE Int'l. Symposium on Bled, Slovenia, Jul. 12-16, 1999, Piscataway, NJ, USA, IEEE, US, vol. 2, Jul. 12, 1999, pp. 590-595.
J. Ollila, "A medium power PV-array simulator with a robust control strategy", Control Applications, 1995, Proceedings of the 4th IEEE Conference on Albany, NY, USA Sep. 28-29, 1995, pp. 40-45.

*Primary Examiner* — David Hung Vu
(74) *Attorney, Agent, or Firm* — Cozen O'Connor

(57) ABSTRACT

A circuit arrangement for striking a discharge lamp, comprising: a drive apparatus, having an output adapted to provide a drive signal with a predeterminable frequency; an inverter, which is coupled to the output of the drive apparatus, and having an output adapted to provide a square-wave signal with a predeterminable duty factor; a load circuit, which is coupled to the output of the inverter and has at least one terminal for the discharge lamp, the load circuit comprising a lamp inductor, which is coupled in series between the output of the inverter and the at least one terminal for the discharge lamp; a first control loop with a first reference variable, a first manipulated variable and a first controlled variable, the first control loop having a first time constant; a second control loop with a second reference variable, an auxiliary manipulated variable and a second controlled variable, the second control loop having a second time constant; and a strike detection apparatus, which is adapted to detect striking of the discharge lamp and, after detection of the striking to switch over the first and the second control loops from the striking operation mode to the continuous operation mode. The auxiliary manipulated variable of the second control loop represents the first reference variable of the first control loop, the first time constant being smaller than the second time constant by at least a factor of 10, and the first manipulated variable represents the duty factor of the output signal of the inverter.

10 Claims, 2 Drawing Sheets

U.S. PATENT DOCUMENTS

| | | | | |
|---|---|---|---|---|
| 5,689,155 A | * | 11/1997 | Chung et al. | 315/199 |
| 6,933,682 B2 | * | 8/2005 | Ziegler | 315/224 |
| 7,525,256 B2 | * | 4/2009 | Ribarich et al. | 315/209 R |
| 2005/0035729 A1 | | 2/2005 | Lev et al. | |

* cited by examiner

CIRCUIT ARRANGEMENT AND METHOD FOR STRIKING A DISCHARGE LAMP

RELATED APPLICATIONS

This is a U.S. national stage of application No. PCT/EP2006/066691, filed on Sep. 26, 2006.

FIELD OF THE INVENTION

The present invention relates to a circuit arrangement for striking a discharge lamp with a drive apparatus, at whose output a drive signal with a predeterminable frequency can be provided, an inverter, which is coupled to the output of the drive apparatus and at whose output a square-wave signal with a predeterminable duty factor can be provided, a load circuit, which is coupled to the output of the inverter and has at least one terminal for the discharge lamp, a first control loop with a first reference variable, a first manipulated variable and a first controlled variable, the first control loop having a first time constant, and a second control loop with a second reference variable, an auxiliary manipulated variable and a second controlled variable, the second control loop having a second time constant The invention furthermore relates to a method for striking a discharge lamp using such a circuit arrangement.

BACKGROUND OF THE INVENTION

High-pressure and low-pressure discharge lamps require high voltages for striking which are provided by electronic ballasts. As is generally known, discharge lamps are used in a wide temperature range, for example from −25° C. to +60° C. One problem in this case is the fact that the inductance of the lamp inductor which is generally arranged in the load circuit is temperature-dependent. Thus, the maximum magnetic flux density and therefore the inductance can fluctuate in the mentioned temperature range by up to 20%. A particular problem is the fact that the inductance is reduced as the temperature increases. Thus, the lamp inductor enters saturation earlier at higher temperatures. In the case of the mentioned reduction in the inductance by 20%, the resonant frequency of the load circuit, whose resonance is utilized for striking, increases by approximately 10%. If, therefore, the resonant frequency is approached from high frequencies, resonance and therefore the production of high currents is already achieved much earlier than at lower temperatures. This entails the risk of destruction of the switches of the inverter, which in particular are often realized as MOSFETs.

This problem has been dealt with in the prior art by the saturation limit of the lamp inductor having been selected as being very high, with the result that saturation could safely be ruled out even at high ambient temperatures. This results in the following undesirable disadvantages: firstly, an inductor which has large dimensions in terms of its saturation response requires a lot of space since a larger inductor design needs to be used given the same winding losses during normal operation. This also enlarges the housing size of the electronic ballast. Both measures increase the costs of the electronic ballast considerably.

Secondly, given the same inductor design, but with a higher saturation limit of the inductor, the power loss of the inductor or the electronic ballast increases during normal operation. This results in the necessity for a larger housing design for the electronic ballast in order that the life is not shortened as a result of the thermal loading.

SUMMARY OF THE INVENTION

An object of the present invention is to provide the circuit arrangement mentioned at the outset or the method mentioned at the outset in such a way that it can be realized with a lamp inductor which has markedly smaller dimensions than in the prior art.

The present invention takes into account the knowledge that, in principle, actually the actual value $U_{act}$ of the lamp voltage $U_L$ should be monitored and increased in small steps up to the intended maximum voltage. However, as a result of the saturation of the lamp inductor, a nonlinearity occurs between the actual value $U_{act}$ of the voltage $U_L$ across the lamp and the actual value $I_{act}$ of the current $I_D$ through the inductor at high temperatures. Owing to this nonlinearity, monitoring of the voltage is on its own insufficient, and instead both variables need to be monitored separately since it is no longer possible to draw conclusions about one variable on the basis of the other. Since, however, the current $I_D$ increases very rapidly on saturation of the inductor, the determination of the lamp voltage $U_L$, which is slow as a result of measurement and correction time constants, is not quick enough in order to disconnect the inverter switches. In one exemplary embodiment of the invention, this takes place between 200 and 400 µs. If the switch-on time $t_{on}$ of the square-wave signal driving the switches of the inverter is from 3 to 10 µs, this also demonstrates that the closed-loop control of the lamp voltage $U_L$ with the specified time constant is too slow. If it is assumed that the closed-loop control should be so quick that, given an exponential rise in the current $I_D$ after saturation, the lamp inductor can be switched off quickly enough, one arrives at the concept according to the invention of subjecting the actual value $I_{act}$ of the inductor current $I_D$ to closed-loop control and monitoring. In the exemplary embodiment, the latter is possible with a time constant of from 100 to 200 ns. Closed-loop control of the actual value $I_{act}$ of the inductor current $I_D$ on its own does not, however, take into account the fact that at the same time the lamp voltage $U_L$ should be increased stepwise up to a maximum value, which is in the range of the intended striking voltage $U_Z$. It is therefore necessary on the one hand to increase the actual value $U_{act}$ of the lamp voltage $U_L$ in order to at some point reach the striking voltage $U_Z$, and on the other hand at the same time to subject the actual value $I_{act}$ of the inductor current $I_D$ to closed-loop control in order to ensure that, on saturation of the lamp inductor, no undesirably high current values arise which could result in destruction of the switches of the inverter. saturation of the lamp inductor, no undesirably high current values arise which could result in destruction of the switches of the inverter.

An aspect of the present invention solves this problem in a particularly clever way by virtue of the fact that the two control loops, i.e. the naturally slow control loop for the closed-loop control of the lamp voltage and the quick control loop for the closed-loop control of the inductor current $I_D$, are linked to one another. In particular, they are linked in such a way that the auxiliary manipulated variable of the second control loop represents the first reference variable of the first control loop. If the second reference variable corresponds to the setpoint value of the voltage across the discharge lamp, the second controlled variable corresponds to the actual value of the voltage across the discharge lamp, the first reference variable corresponds to the setpoint value of the current through the inductor, and the first controlled variable corresponds to the actual value of the current through the inductor, thus, in other words, the actual value of the lamp voltage is increased stepwise (slow control loop) and the resultant rise in the actual value $I_{act}$ of the inductor current (quick control loop) is monitored.

As has been demonstrated in exemplary embodiments realized, reliable closed-loop control up to from eight to ten times the saturation current of the lamp inductor is possible with this arrangement.

The present invention therefore makes it possible to generate an in particular constant striking voltage independently of temperature influences. A further advantage consists in the fact that this closed-loop control can be used to generate stable voltages independently of the rate of rise of the load circuit. In addition, as a result of the invention, the components, in particular the lamp inductor, the MOSFETs of the inverter and the capacitors used in the circuit arrangement, are subjected to a far lesser load during striking than in the prior art, as a result of which the life of the components is extended. In addition, the lamp inductor can be dimensioned so as to have fewer losses for normal operation. This means that a smaller inductor design can be used, which in turn contributes to a saving on space and a cost saving. The monitoring of the actual value $U_{act}$ of the lamp voltage in accordance with the present invention moreover also makes it possible to realize the capacitors with smaller dimensions and a smaller design, as a result of which high voltages can be avoided.

As an alternative to the proposed exemplary embodiment, in which the second reference variable corresponded to the setpoint value of the voltage across the discharge lamp, and the second controlled variable corresponded to the actual value of the voltage across the discharge lamp, it is naturally readily possible for the setpoint value of the current through the inductor to be used as the second reference variable and for the actual value of the current through the inductor to be used as the second controlled variable.

Preferably, the second reference variable corresponds to the temporal mean within a predeterminable time period. In a preferred exemplary embodiment, this time period is between 200 μs and 1 ms.

While the frequency is varied in the circuit arrangements known from the prior art in order to reach the striking voltage, in the circuit arrangement according to the invention, the frequency preferably remains fixed. In order that a frequency can be fixedly predetermined, measures for varying the frequency are no longer required.

The first time constant is preferably from 10 to 1000 ns, preferably from 100 to 200 ns. The second time constant is preferably from 10 to 1000 μs, preferably from 200 to 400 μs. If this is compared with the switch-on time $t_{on}$ of the signal driving the inverter, which switch-on time $t_{on}$ is of the order of magnitude of between 1 and 50 μs, preferably between 3 and 10 μs, it can be seen that the closed-loop control of the current is much quicker, and the closed-loop control of the voltage is much slower. The frequency of the signal driving the switches of the inverter is preferably between 30 kHz and 100 kHz. The first control loop is thus so quick that it can be switched off quickly enough in the case of an exponential rise in the current $I_D$ through the inductor after start of saturation of the lamp inductor, even before critical current ranges occur for the switches of the inverter.

As has already been mentioned, the first control loop and the second control loop each have an interference variable, which primarily represents the ambient temperature.

Preferably, a circuit arrangement according to the invention furthermore has a strike detection apparatus, which is designed to detect striking of the discharge lamp and, after detection of the striking, to switch over the first and the second control loop from the striking operation mode to the continuous operation mode.

Further preferred embodiments are given in the dependent claims.

The preferred embodiments described above with reference to the circuit arrangement according to the invention and the advantages of said embodiments apply correspondingly, where applicable, to the method according to the invention.

BRIEF DESCRIPTION OF THE DRAWING(S)

An exemplary embodiment of a circuit arrangement according to the invention will now be described in more detail below with reference to the attached drawings, in which.

PREFERRED EMBODIMENT OF THE INVENTION

Figure 1:
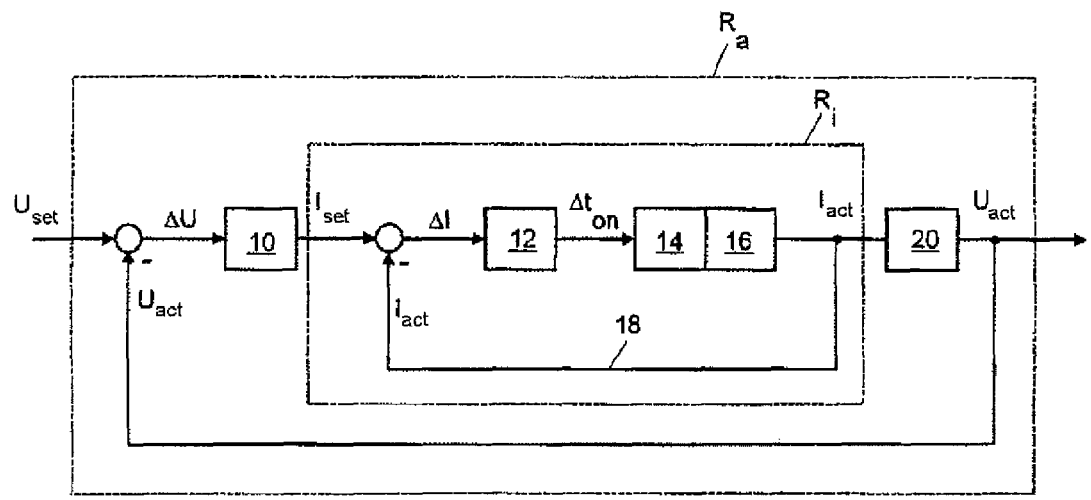
FIG. 1 shows a schematic illustration of the coupling between a first and a second control loop in a first embodiment of a circuit arrangement according to the invention.

FIG. 1 shows a schematic illustration of the coupling between a first, inner control loop $R_i$ and a second, outer control loop $R_a$ in accordance with a first exemplary embodiment of a circuit arrangement according to the invention. Accordingly, the reference variable of the outer control loop $R_a$ is the setpoint value $U_{set}$ of the lamp voltage $U_L$ of a discharge lamp (not illustrated). The feedback variable is formed by the actual value $U_{act}$ of the lamp voltage $U_L$, which at the same time represents the controlled variable of the outer control loop. The difference $\Delta U$ between the setpoint value $U_{set}$ and the actual value $U_{act}$ of the lamp voltage $U_L$ represents the control error, which is fed to a block 10, which contains an I element (integrator) and a table or a conversion formula, with which a setpoint value $I_{set}$ of the inductor current $I_D$ can be fixed from the integral via the difference $\Delta U$, for mean value generation. This setpoint value $I_{set}$ is used as the reference variable of the inner control loop There, first the difference $\Delta I$ from the actual value $I_{act}$ of the inductor current $I_D$ is formed again, which is supplied to a block 12 in order to produce a change $\Delta t_{on}$ in the switch-on time and therefore in the duty factor of the signal to be supplied to the inverter 14, which is preferably in the form of a half-bridge circuit with two MOSFET transistors, via a formula or a reference table there. The inverter 14 feeds the load circuit 16 and in the process generates the actual value $I_{act}$ of the inductor current $I_D$. The actual value $I_{act}$ is used via a feedback line 18 as a feedback variable of the inner control loop $R_i$. The actual value $U_{act}$ of the lamp voltage $U_L$ is formed from the actual value $I_{act}$ of the inductor current $I_D$ at the lamp 20, in particular the circuitry thereof, which comprises a resonant capacitor. This actual value $U_{act}$ is used as the feedback variable of the outer control loop $R_a$.

The time constant of the inner control loop $R_i$ is between 10 and 1000 ns, preferably between 100 and 200 ns. The time constant of the outer control loop $R_a$ is between 10 and 1000 μs, preferably between 200 and 400 μs.

Figure 2:
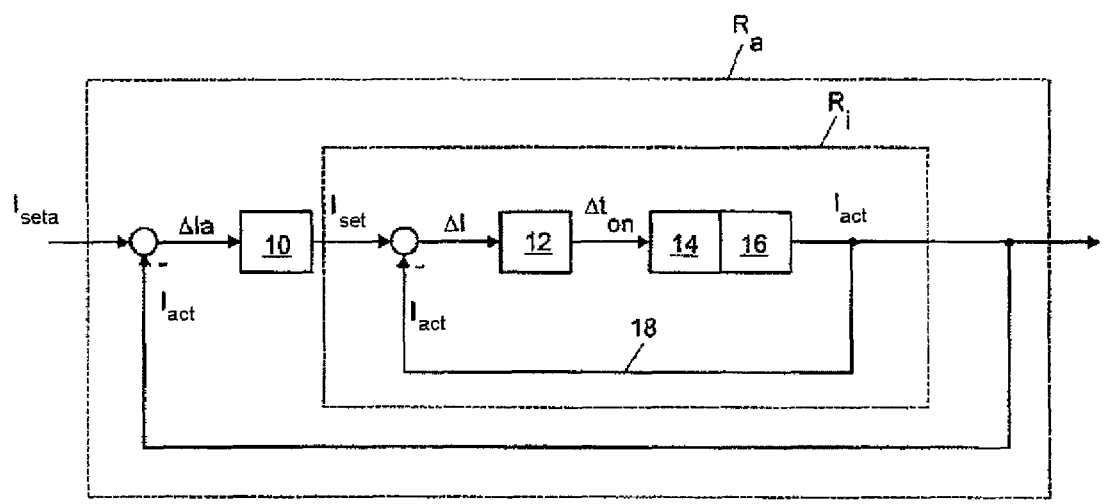
FIG. 2 shows a schematic illustration of the coupling between a first and a second control loop in a second embodiment of a circuit arrangement according to the invention.

FIG. 2 shows a schematic illustration of a second exemplary embodiment of the invention with the coupling between a first control loop $R_i$ and a second control loop $R_a$, the reference symbols introduced with reference to FIG. 1 continuing to apply for identical and similar elements and therefore not being described again. In contrast to FIG. 1, however, in this case the actual value $I_{act}$ of the inductor current $I_D$ is used as the controlled variable of the outer control loop $R_a$. Correspondingly, the reference variable of the outer control loop is the setpoint value $I_{seta}$ of the inductor current $I_D$. This variable is preferably determined at the resonant capacitor of the striking circuit, which is part of the load circuit.

Figure 3:
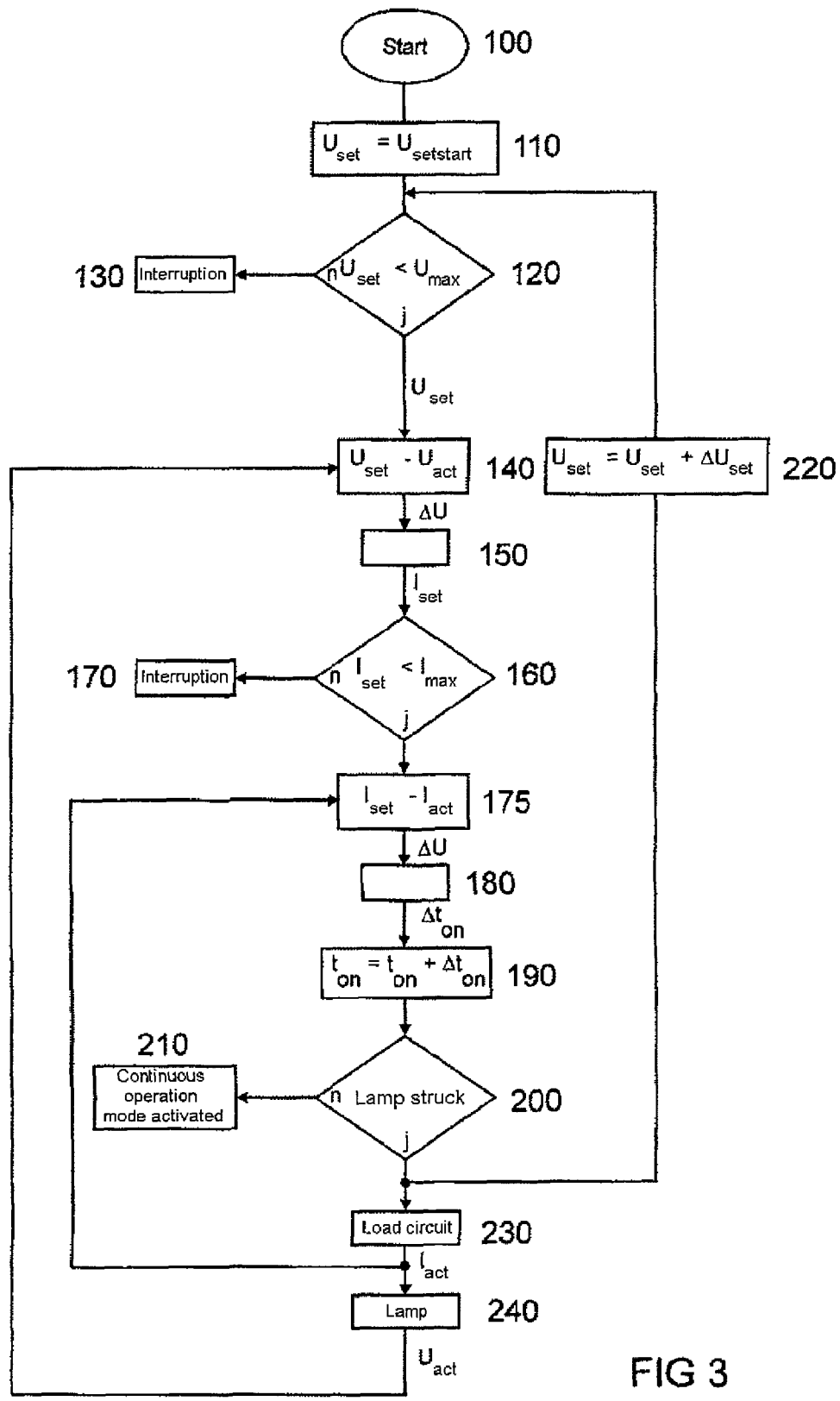
FIG. 3 shows the signal flowcharts associated with the embodiment in FIG. 1.

FIG. 3 shows the signal flowcharts associated with the exemplary embodiment in FIG. 1. After the start in step 100, the setpoint value $U_{set}$ is set to the start value $U_{setstart}$ in step 110. In step 120, a check is carried out to ascertain whether $U_{set}$ is smaller than a maximum value $U_{max}$ of the voltage $U_L$ across the lamp. This is intended to ensure, in order to avoid damage to the circuit arrangement, that the range in which the lamp generally is struck is not left. If $U_{set}$ is above $U_{max}$, this results in interruption of the striking operation in step 130. If, on the other hand, $U_{set}$ is below $U_{max}$, the difference $\Delta U$ is formed from the present actual value $U_{act}$ of the lamp voltage $U_L$ and the predetermined setpoint value $U_{set}$ in step 140. This difference $\Delta U$ is supplied to the block 10 and produces the present setpoint value $I_{set}$ for the inductor current $I_D$ in step 150. In step 160, a check is now carried out to ascertain whether the present value for $I_{set}$ is smaller than a maximum current value $I_{max}$. If this is not the case, the striking operation is interrupted in step 170. If $I_{set}$ is smaller than $I_{max}$, the difference $\Delta I$ is formed from the setpoint value $I_{set}$ and the actual value $I_{act}$ of the inductor current $I_D$ is formed in step 175. In block 12, the value for $\Delta t_{on}$, i.e. the time period, is determined from the difference $\Delta I$ in step 180 in order to increase the switch-on duration of the switches of the inverter. The present time period $t_{on}$ is thereupon calculated in step 190. Then, a check is carried out in step 200 to ascertain whether the lamp has been struck. If this is the case, the continuous operation mode is activated in step 210. If the check in step 200 shows that the lamp has not yet been struck, $U_{set}$ is increased by a predeterminable increment $\Delta U_{set}$ in step 220 and fed back as the present $U_{set}$ to the input of step 120. From the driving with the changed switch-on time $t_{on}$, a new actual value $I_{act}$ of the inductor current $I_D$ is formed in step 230 via the load circuit, which new actual value $I_{act}$ is fed back in step 170. An actual value $U_{act}$ of the lamp voltage $U_L$ is formed in step 240 from the actual value $I_{act}$ of the inductor current $I_D$ via the high-pressure discharge lamp 20.

In the exemplary embodiment illustrated in FIG. 3, the event of a maximum value $U_{max}$ of the lamp voltage $U_L$ being reached or exceeded and the event of a maximum value $I_{max}$ of the inductor current $I_D$ being reached or exceeded have been specified as interruption criteria. In addition or as an alternative, it could be provided that the lamp is operated over a predeterminable time period at a maximum value $U_{max}$ of the lamp voltage $U_L$ prior to an interruption in step 130, and the interruption is only carried out once a predeterminable period of time has been exceeded.

The invention claimed is:

1. A circuit arrangement for striking a discharge lamp, comprising:
    a drive apparatus, having an output adapted to provide a drive signal with a predeterminable frequency;
    an inverter, which is coupled to the output of the drive apparatus, and having an output adapted to provide a square-wave signal with a predeterminable duty factor;
    a load circuit, which is coupled to the output of the inverter and has at least one terminal for the discharge lamp, the load circuit comprising a lamp inductor, which is coupled in series between the output of the inverter and the at least one terminal for the discharge lamp;
    a first control loop with a first reference variable, a first manipulated variable and a first controlled variable, the first control loop having a first time constant;
    a second control loop with a second reference variable, an auxiliary manipulated variable and a second controlled variable, the second control loop having a second time constant; and
    a strike detection apparatus, which is adapted to detect striking of the discharge lamp and, after detection of the striking to switch over the first and the second control loops from the striking operation mode to the continuous operation mode;
    wherein the auxiliary manipulated variable of the second control loop represents the first reference variable of the first control loop, the first time constant being smaller than the second time constant by at least a factor of 10, and the first manipulated variable represents the duty factor of the output signal of the inverter (14).

2. The circuit arrangement as claimed in claim 1, wherein the first reference variable corresponds to the setpoint value of the current through the lamp inductor, and the first controlled variable corresponds to the actual value of the current through the lamp inductor.

3. The circuit arrangement as claimed in claim 1, wherein the second reference variable corresponds to the setpoint value of the current through the lamp inductor, and the second controlled variable corresponds to the actual value of the current through the lamp inductor.

4. The circuit arrangement as claimed in claim 1, wherein the second reference variable corresponds to the setpoint value of the voltage across the discharge lamp, and the second controlled variable corresponds to the actual value of the voltage across the discharge lamp.

5. The circuit arrangement as claimed in claim 3, wherein the second reference variable corresponds to the temporal mean within a predeterminable time period.

6. The circuit arrangement as claimed in claim 1, wherein the frequency is fixed.

7. The circuit arrangement as claimed in claim 1, wherein the first time constant is from 10 to 1000 ns, preferably from 100 to 200 ns.

8. The circuit arrangement as claimed in claim 1, wherein the second time constant is from 10 to 1000 μs, preferably from 200 to 400 μs.

9. The circuit arrangement as claimed in claim 1, wherein the first control loop has a first interference variable, and the second control loop has a second interference variable, which variables each represent the ambient temperature.

10. A method for striking a discharge lamp using a circuit arrangement with a drive apparatus, which provides a drive signal with a predeterminable frequency at the output of said drive apparatus, with an inverter, which is coupled to the output of the drive apparatus and which provides a square-wave signal with a predeterminable duty factor at its output, with a load circuit, which is coupled to the output of the inverter and has at least one terminal for the discharge lamp, the load circuit comprising a lamp inductor, which is coupled in series between the output of the inverter and the at least one terminal for the discharge lamp, with a first control loop with a first reference variable, a first manipulated variable and a first controlled variable, the first control loop having a first time constant, with a second control loop with a second reference variable, an auxiliary manipulated variable and a second controlled variable, the second control loop having a second time constant;
    wherein the method comprises the steps of:
    coupling the first and the second control loop in such a way that the auxiliary manipulated variable of the second control loop represents the first reference variable of the first control loop;
    fixing the first time constant such that it is smaller than the second time constant by at least a factor of 10; and
    using the duty factor of the output signal of the inverter as the first manipulated variable.

* * * * *